March 20, 1945.  R. L. LEMING  2,371,831
LAYOUT AND DRILL "V" BLOCK
Filed Aug. 19, 1942
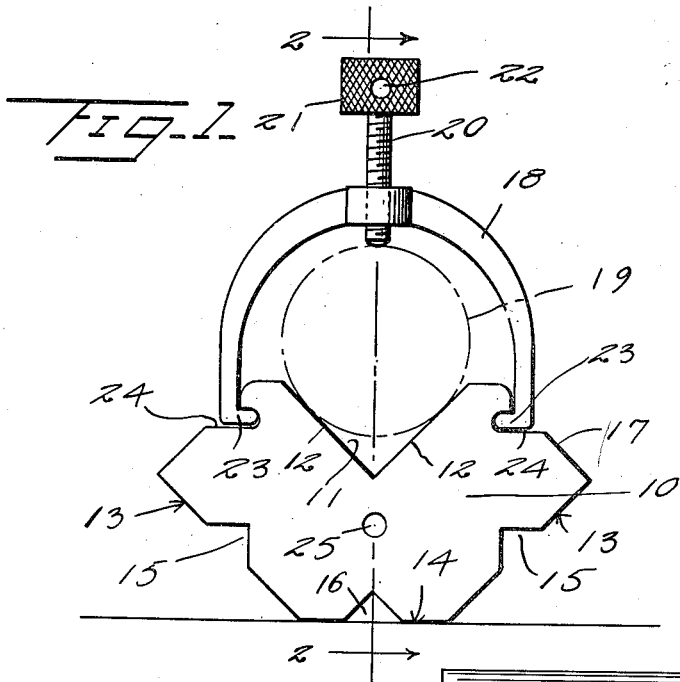
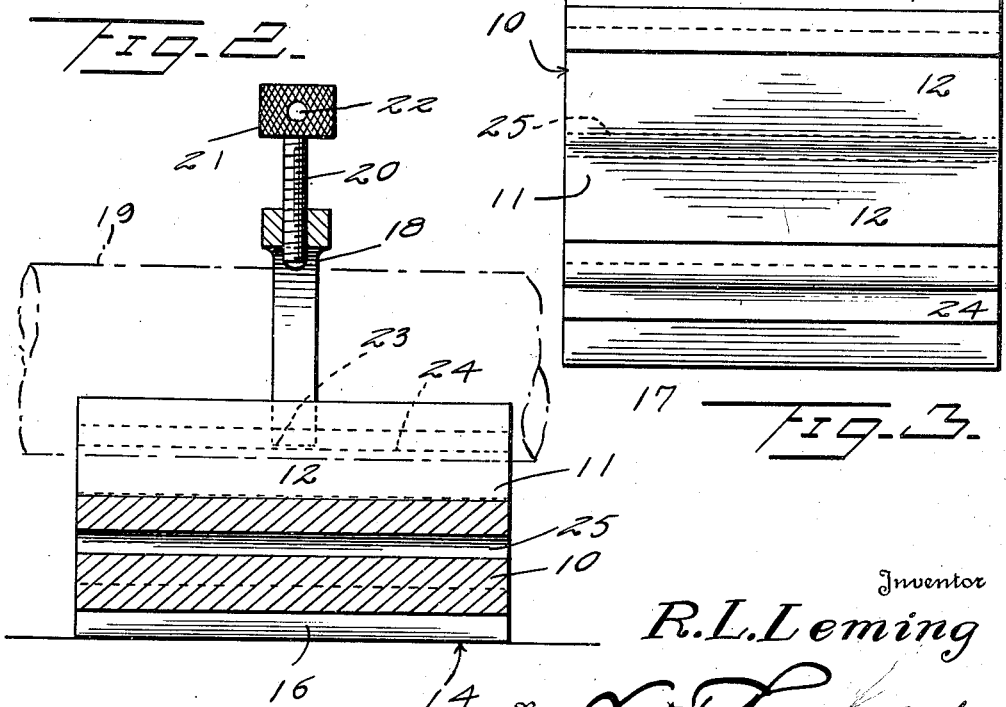
Inventor
R. L. Leming
By
Attorney Patented Mar. 20, 1945

2,371,831

UNITED STATES PATENT OFFICE 2,371,831

LAYOUT AND DRILL V-BLOCK

Robert L. Leming, Florissant, Mo.

Application August 19, 1942, Serial No. 455,384

1 Claim. (Cl. 77—63)

This invention relates to a layout and drill V block.

It is aimed to provide a novel block which may be used in connection with work for laying out points different angles to each other, particularly 90°, and drilling them without removing the work from the V block.

In addition, it is aimed to provide such a block in which the work may be clamped and the center line ascertained relatively to one base of the block, and the block turned usually 90° onto another base while maintaining said center line. Drilling may be effected when the block is supported on each base.

The more specific objects and advantages will become apparent from a consideration of the description following taken in connection with accompanying drawing illustrating an operative embodiment.

In said drawing—

Figure 1 is a view in end elevation of the block in connection with work clamped in place thereon;

Figure 2 is a vertical longitudinal section taken on the line 2—2 of Figure 1 and Figure 3 is a plan view of the block.

Referring specifically to the drawing wherein like reference characters designate like or similar parts, the block is disclosed at 10, being generally of V shape and made of any desired material, usually metal or a plastic. Said block 10 has a V groove at 11 which is defined by walls or surfaces 12 at 90° to each other and of the same extent transversely of the block. Parallel to the walls or surfaces 12 are walls, surfaces or bases 13, at 90° to each other and each of the same length. Between the bases or surfaces 13, is a wall, surface or base 14, disposed at 45° with respect to them. Such surfaces 13 and 14 are selectively used as bases and in order to enable them to make better and level contact with supporting surfaces, they are preferably longitudinally grooved as at 15 and 16, respectively. The edge walls which connect the surfaces or walls 12 and 13 are designated 17 and disposed at 90° with respect thereto.

An inverted U-shaped clamp 18 or any equivalent, is used to secure work 19 in the groove 11, such work being cylindrical as shown or otherwise, same being clamped in place by the binding of a screw 20 against the same. Such screw 20 is screw threaded to the clamp 18 and has an externally knurled head 21 and also an opening 22 therethrough to accommodate the rod or other element to facilitate turning.

Said clamp 18 at its lower terminals has inwardly extending lugs 23 and inwardly extending grooves 24 are provided on the block 10 at the surfaces 17 to slidably and adjustably receive such lugs.

It will be noted that a hole 25 is provided longitudinally of the block parallel to the bases and that it intersects the vertical center line between the surfaces 12 and 13. The blocks may be used in pairs or in any desired number in which event rods may be engaged with the holes 25 thereof to line up the different blocks.

It will be realized that the construction of the block is such that it can be used for laying out points at 90° with respect to each other and drilling the same without removing the work from the block. The accomplish this end, the center line of the work is ascertained by supporting the block while the work is clamped thereto, on either of the bases 13 or 14, and then turning the block onto another of such bases. The center line will be maintained and also will be 90° from the first. The drilling is accomplished in the same way. In order to drill on a 45° angle rather than a 90° angle, the block is supported on its base 14.

The extent of the surfaces or bases 13, transversely of the block should be approximately at least one-third longer than the corresponding dimensions of the surfaces 12 so that the center of gravity will not throw the block off of either base 13. For this reason, also, the corresponding surfaces that is 13—13, 12—12 and 17—17 are equal. While the block may be of any desired length, yet for practical purposes, it should be at least the same length as the widest part thereof.

The grooves or cutouts 15 and 16 relieve approximately one-third of the surfaces or bases so that foreign matter on the surface plate may be scraped or accommodated within the same to reduce chances of error caused by an uneven surface.

Various changes may be resorted to provided they fall within the spirit and scope of the invention.

I claim as my invention:

A layout and drill block having a relatively flat surface to rest on a support, surfaces selectively capable of resting on a support diverging from the first-mentioned surface, other surfaces parallel to the diverging surfaces to form a work-receiving V, and means adjustably mounted by the block to clamp the work in said V.

ROBERT L. LEMING.